Dec. 19, 1967  D. D. CALL  3,358,555
MACHINE FOR MICROFILMING FAN-FOLDED DOCUMENTS
Original Filed Oct. 10, 1962  8 Sheets-Sheet 3

Inventor
Daniel D. Call
By
Hill, Sherman, Meroni, Gross & Simpson Attys.

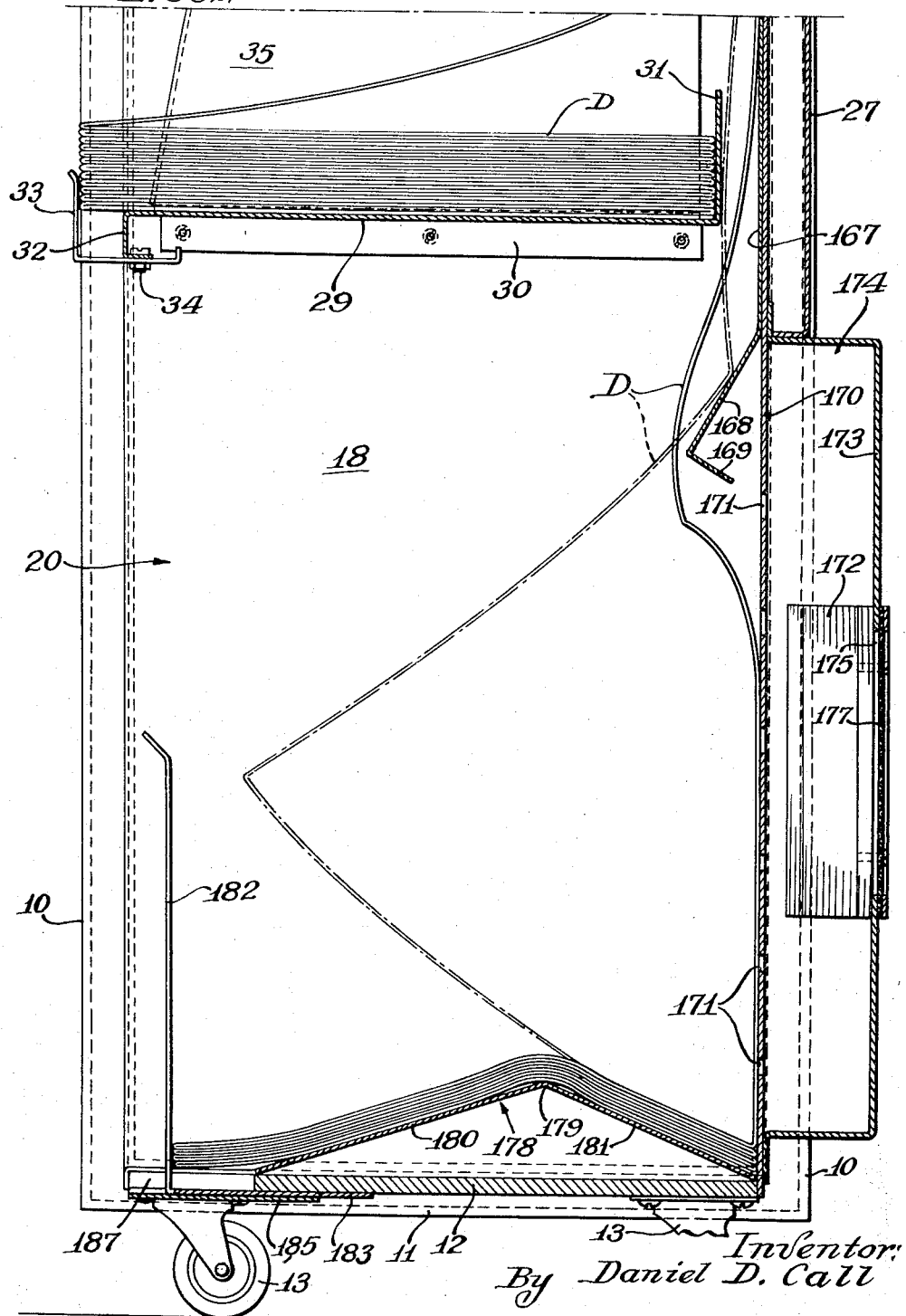

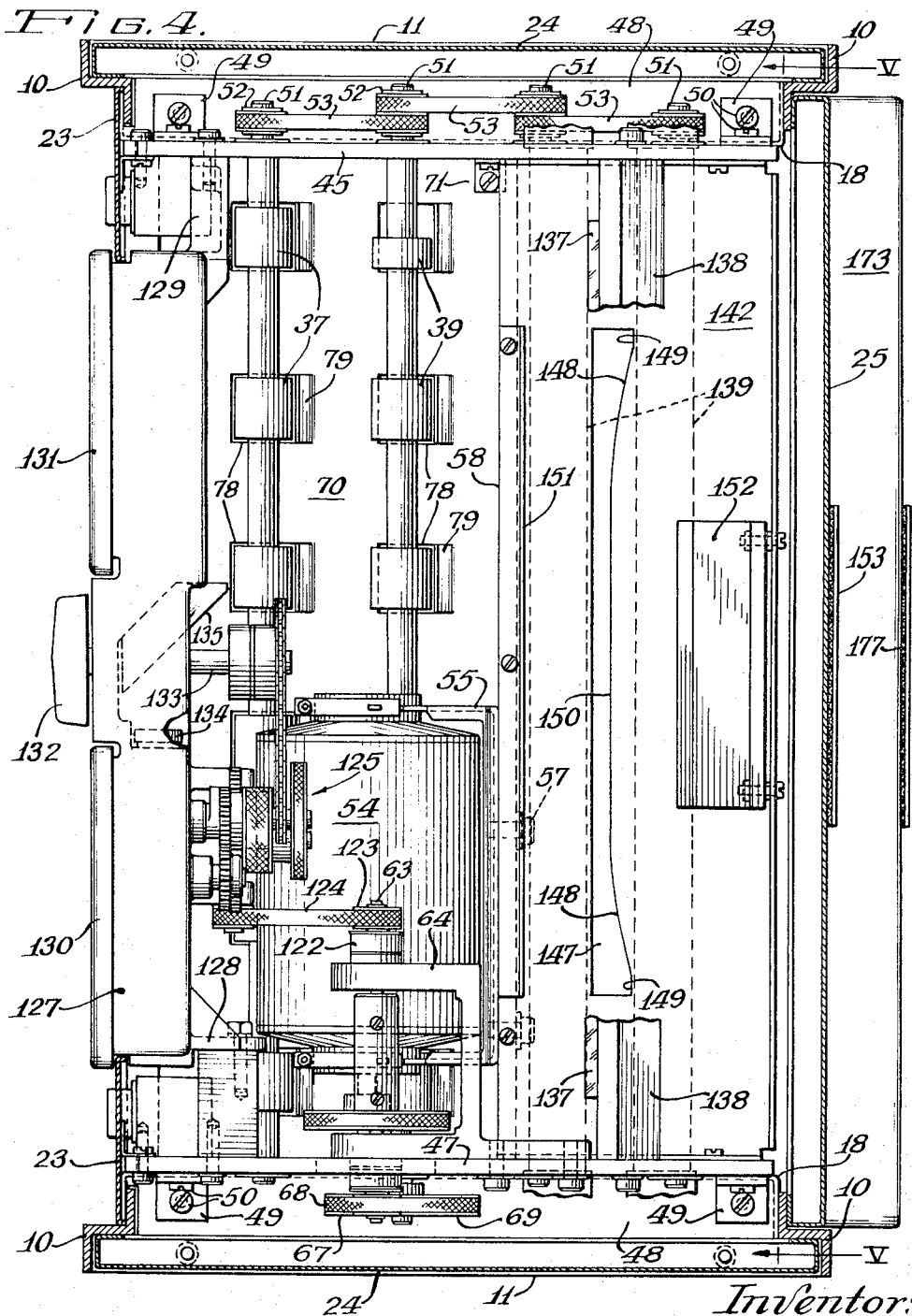

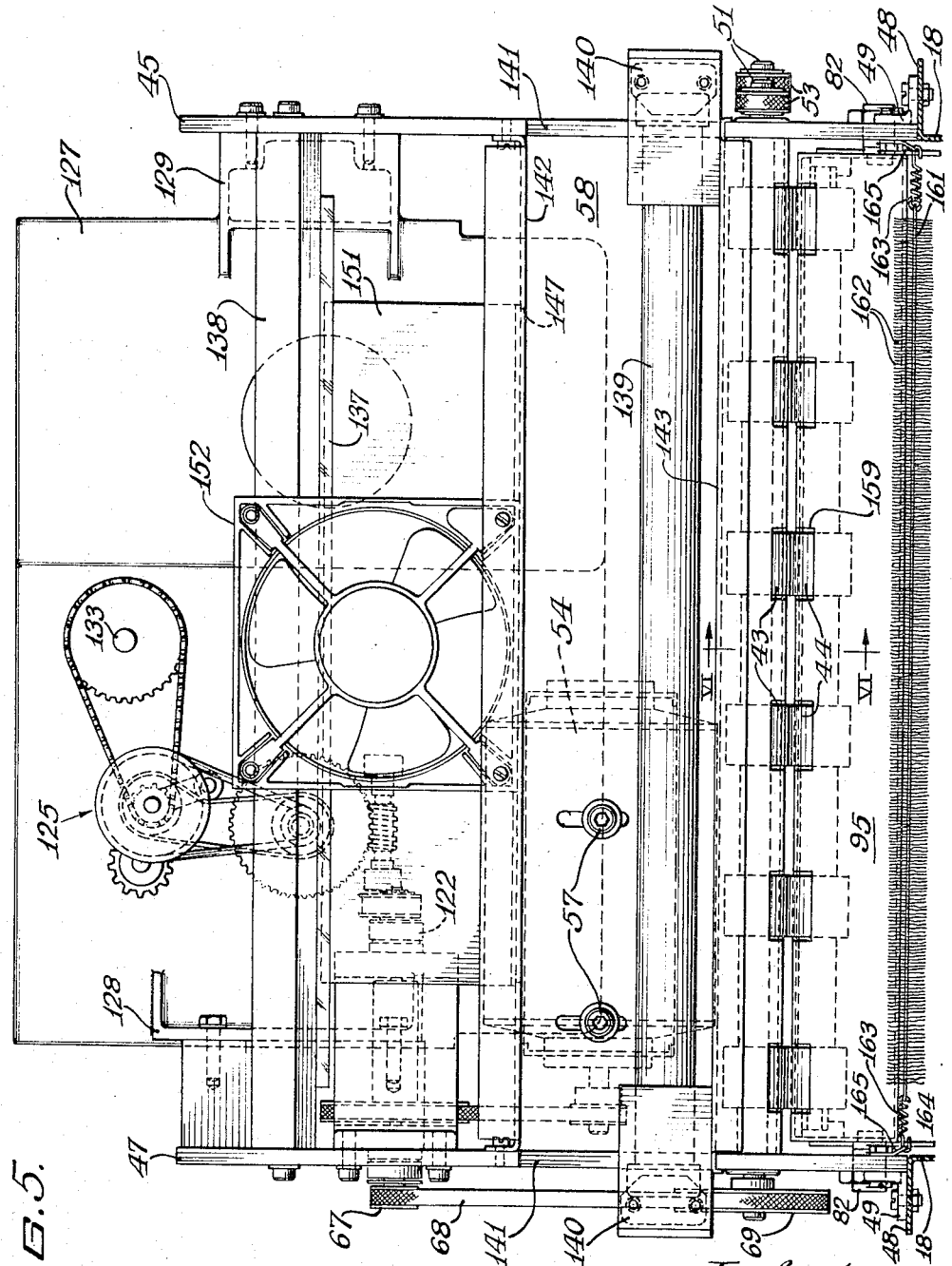

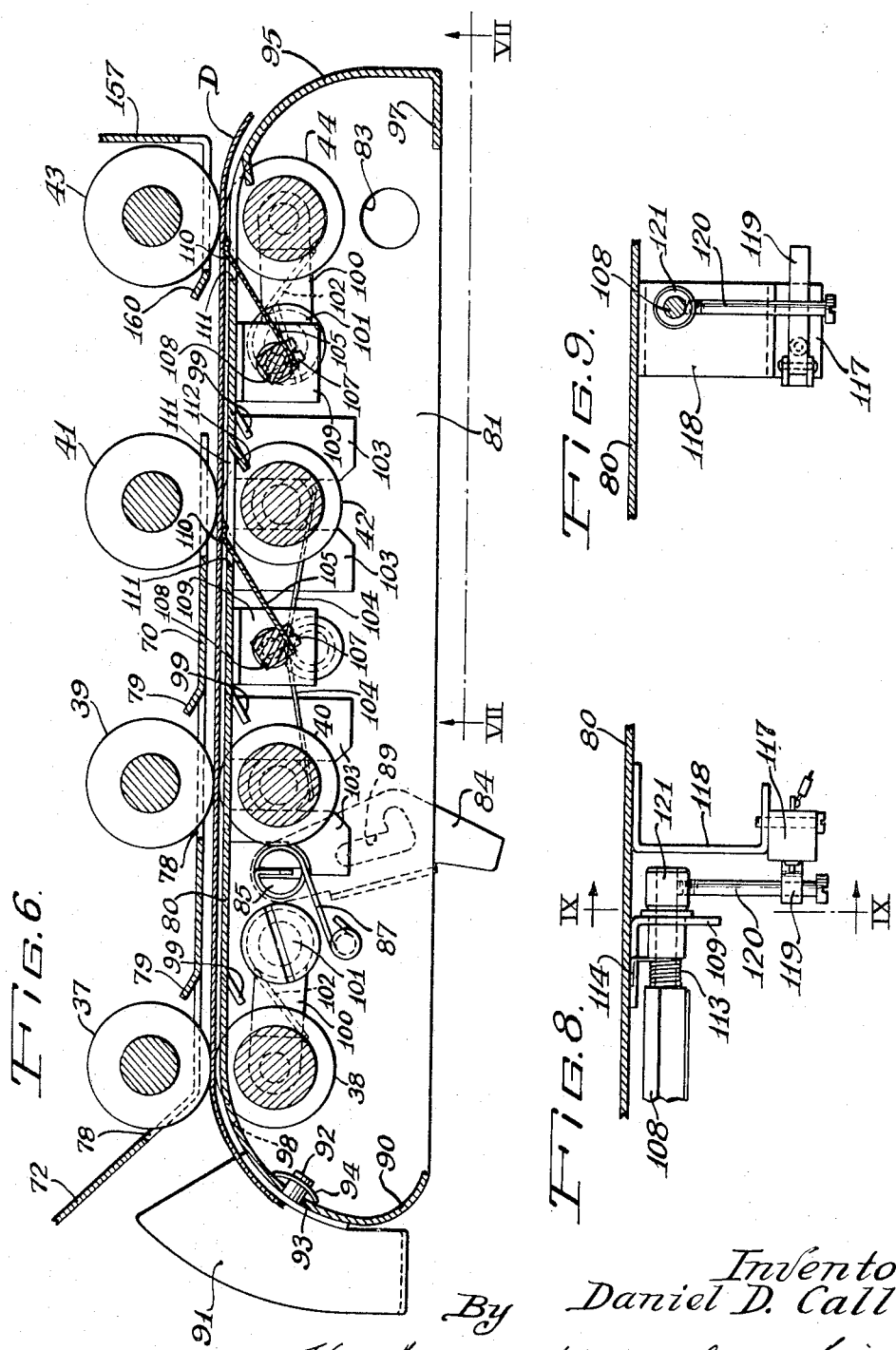

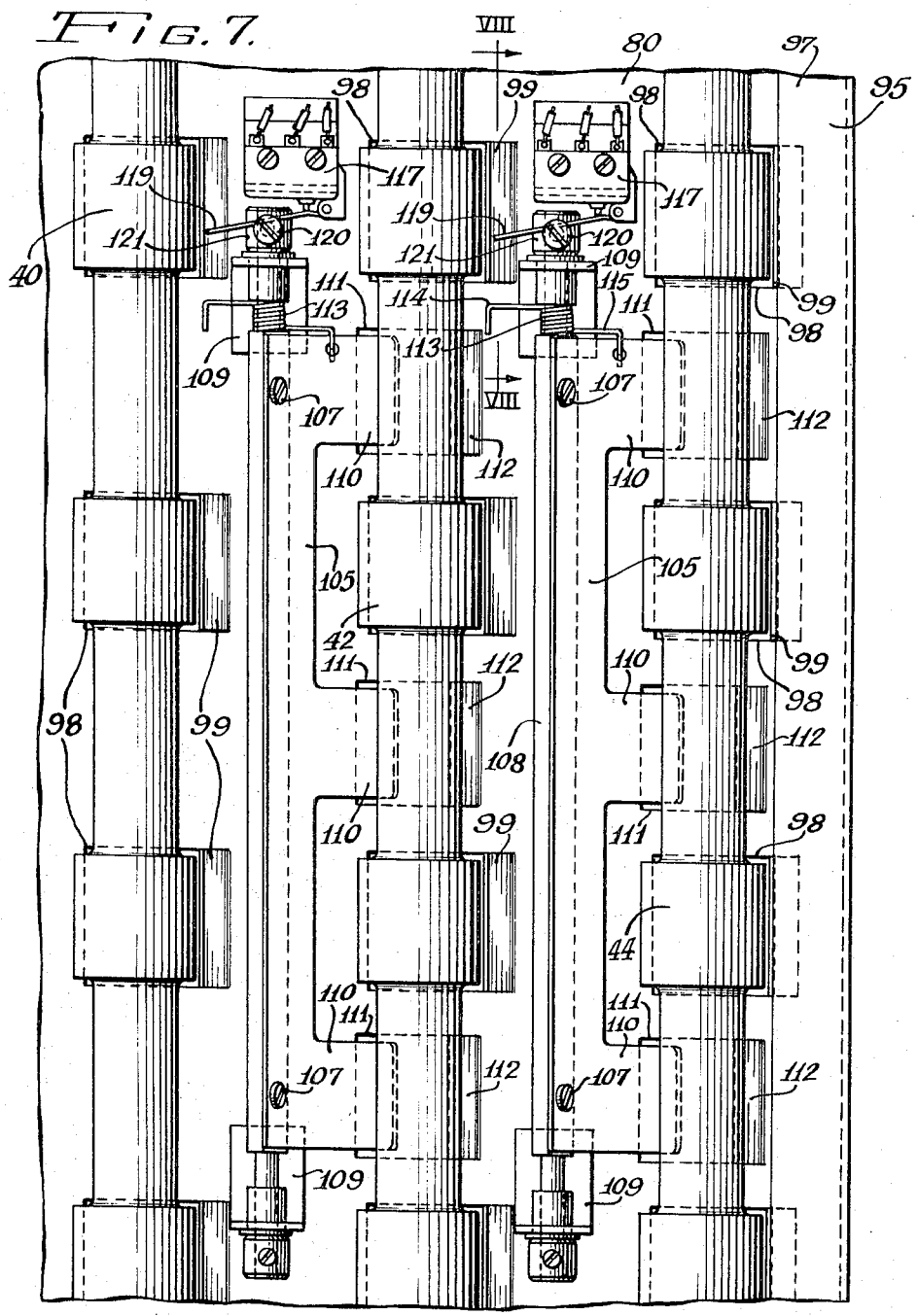

United States Patent Office 3,358,555
Patented Dec. 19, 1967

3,358,555
MACHINE FOR MICROFILMING FAN-FOLDED DOCUMENTS
Daniel D. Call, Elk Grove, Ill., assignor to Bell & Howell Company, Chicago, Ill., a corporation of Illinois
Original application Oct. 10, 1962, Ser. No. 229,540, now Patent No. 3,255,662, dated June 14, 1966. Divided and this application Oct. 8, 1965, Ser. No. 494,087
11 Claims. (Cl. 88—24)

This application is a division of my copending application, Ser. No. 229,540, filed Oct. 10, 1962, now U.S. Patent No. 3,255,662, issued June 14, 1966.

This invention relates to improvements in apparatus for microfilming documents in flow camera fashion, and is more particularly concerned with the successful microfilming of continuous strip fan-folded material such as accounting, bookkeeping and like forms.

Microfilming of individual documents has attained a fairly high state of development, but a substantial problem has existed in respect to the microfilming of copies of fan-folded continuous forms such as are extensively employed in connection with tabulating machines, and the like, for accounting and bookkeeping purposes. Therefore it has been generally necessary heretofore to make carbon copies of these fairly large and bulky forms, where necessary for distribution, for auditing, or security purposes.

A major problem has existed in the lack of satisfactory means for folding and stacking the filmed fan-folded forms in properly indexed sequence, and more particularly at the high speed of operation presently permitted by flow camera microfilming processes.

Another problem has existed in lack of entirely satisfactory means for high speed accurate feeding of continuous wide form material of the kind under consideration in a simple, foolproof manner.

A further problem has resided in the attainment of filmed records of uniform density across the entire substantial width of forms of this character. That is, a serious problem of "fall off" and lack of clarity or density of side marginal portions of the filmed image in comparison with the central portions of the image has heretofore been experienced when microfilming wide documents.

An important object of the present invention is to provide a new and improved machine for microfilming continuous documents, and more particularly fan-folded documents, which overcomes the foregoing problems effectively and operates with high efficiency.

Another object of the invention is to provide a new and improved machine for microfilming fan-folded documents wherein the documents are automatically fed, microfilmed, and restacked in a continuous flow.

A further object of the invention is to provide a new and improved machine for filming continuous documents and embodying a novel feed mechanism to transport the documents through the exposure field for a flow camera.

Still another object of the invention is to provide novel means in a microfilming apparatus for wide documents enabling the attainment of microfilm images of uniform density entirely across the width of the documents although the filming takes place at high speed in a continuous forward flow camera synchronization.

A still further object of the invention is to provide new and improved fan-fold stacking means of simple, efficient construction and operation especially adapted for restacking in proper sequence fan-folded documents that have passed as a continuous strip through a microfilming path.

Yet another object of the invention is to provide a new and improved method of continuous microfilming of fan-folded records.

Other objects, features and advantages of the present invention will be readily apparent from the following detailed description of a preferred embodiment thereof taken in conjunction with the accompanying drawings, in which:

FIGURE 3a is a downward continuation of the vertical sectional view through the machine along the section line IIIa—IIIa of FIGURE 1;

FIGURE 4 is a horizontal sectional plan view taken substantially on the line IV—IV of FIGURE 2;

FIGURE 5 is a fragmentary vertical sectional elevational detail view looking toward the back of the upper portion of the machine and taken substantially along the line V—V of FIGURE 4;

FIGURE 6 is an enlarged fragmentary sectional detail view through the document feed mechanism taken substantially along the line VI—VI of FIGURE 5;

FIGURE 7 is a fragmentary plan view of the underside of the document feed mechanism taken substantially in the plane of line VII—VII of FIGURE 6;

FIGURE 8 is a sectional elevational detail view taken substantially on the line VIII—VIII of FIGURE 7; and FIGURE 9 is a sectional elevational detail view taken substantially on the line IX—IX of FIGURE 8.

Figure 1:
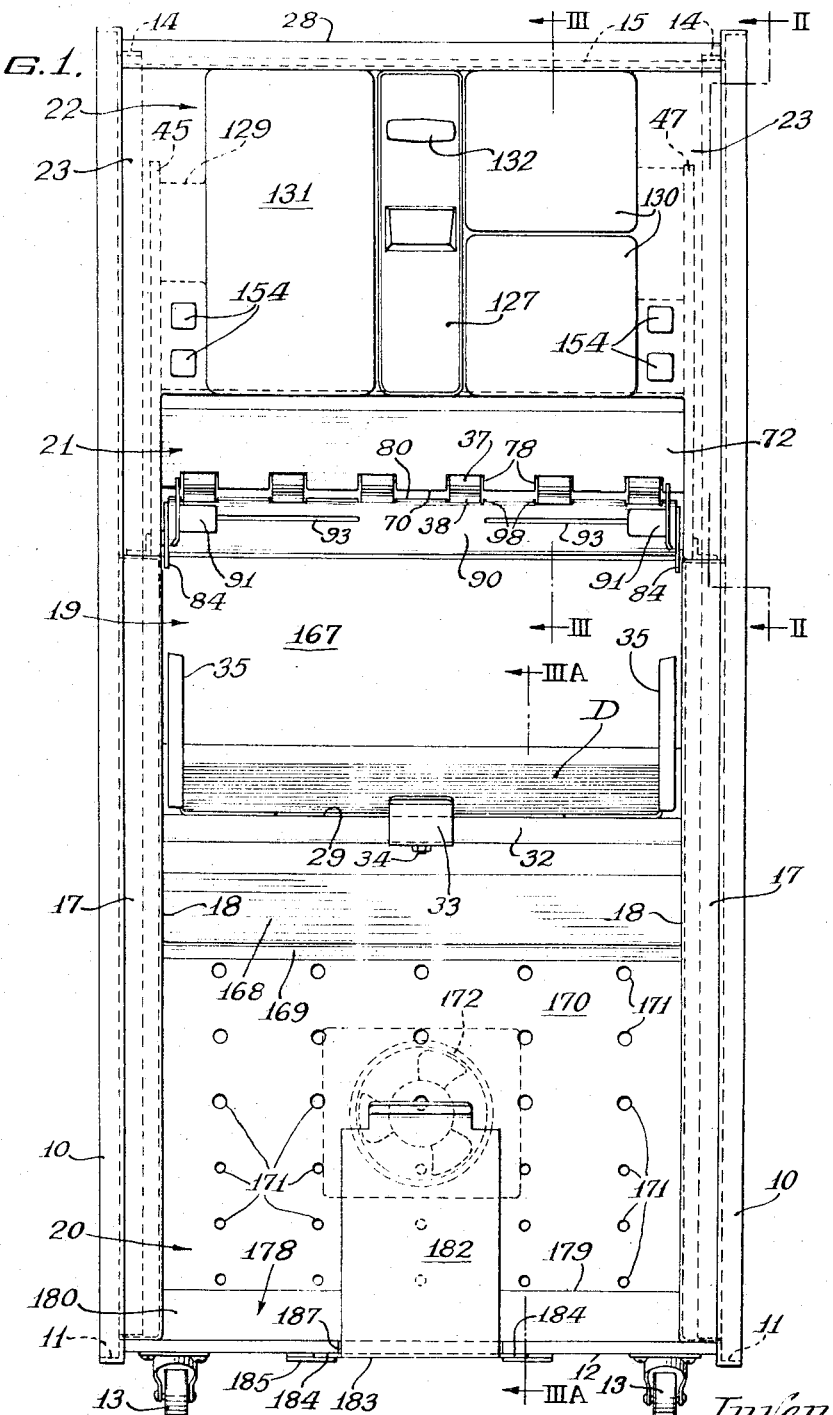
FIGURE 1 is a front elevational view of a machine embodying the present invention.
Figure 2:
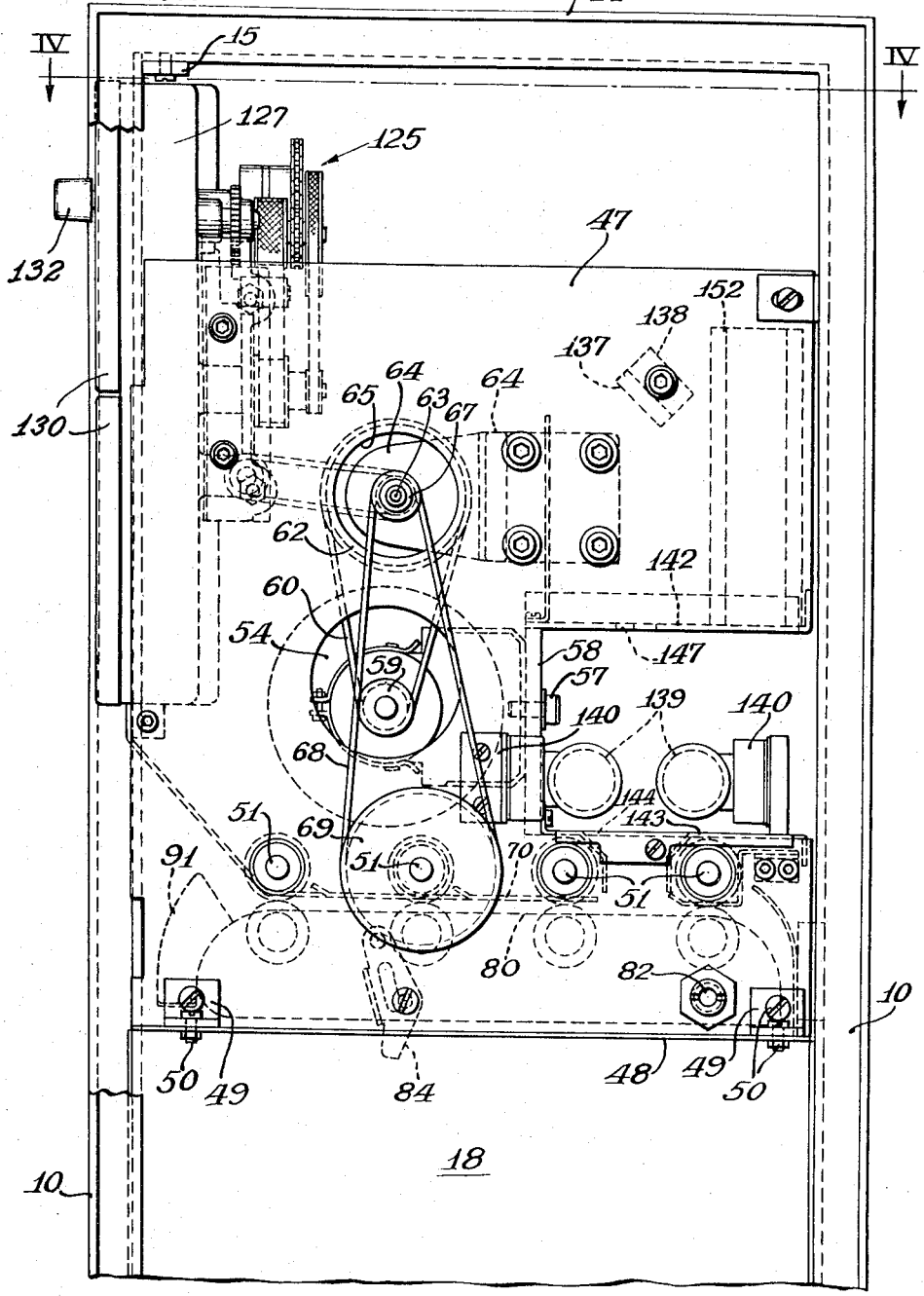
FIGURE 2 is an enlarged fragmentary side elevational view taken substantially on the line II—II of FIGURE 1.
Figure 3:
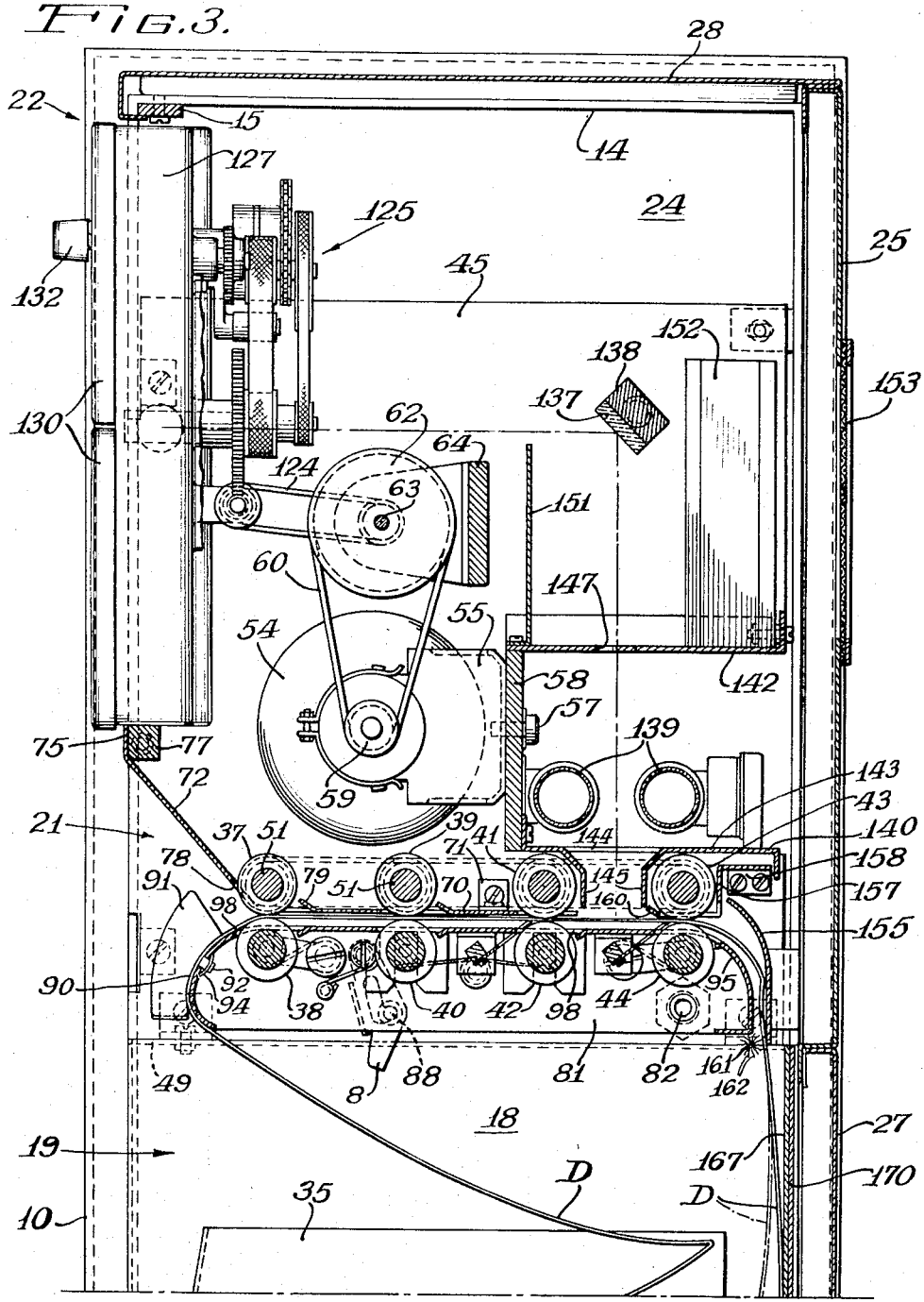
FIGURE 3 is an enlarged fragmentary vertical sectional elevational detail view taken substantially on the line III—III of FIGURE 1.

In the exemplary form of the invention illustrated, a self-contained upright cabinet unit is provided constructed and arranged to fit conveniently with other office equipment such as computers and the like, from which continuous fan-folded strips of forms to be microfilmed are derived. To this end, a rigid cabinet framework includes spaced parallel vertical front and rear corner frame Z-bars 10 (FIGS. 1 and 4) connected together at their lower ends at each side of the cabinet by respective front-to-rear frame bars 11 having rigidly secured thereto a horizontal bottom plate 12, to the underside of which may be attached suitable casters 13 to render the cabinet readily movable. At the top of the unit front-to-rear side frame bars 14 rigidly connect the upper ends of the vertical corner bars 10, and secured between the front end portions of the bars 14 is a cross or header bar 15 (FIGS. 1, 2 and 3).

Desirable paneling is supported by the cabinet frame to enclose the internal working space provided by the frame and afford protection within a neat and attractive housing. At the front of the machine (FIG. 1) which is desirably left open for ready accessibility throughout the major extent above the bottom plate or panel 12, only narrow vertical front flange portions 17 of vertical inside front-to-rear parallel liner panels 18 are provided defining a mid-height forwardly opening magazine chamber area 19 and therebelow a forwardly opening receiving and stacking chamber area 20. Attachment of the liner panels 18 and their front opening framing flanges 17 may be effected to the cabinet frame in any desirable manner such as by known expedients comprising screws, welding and the like.

Above the magazine area 19, a forwardly opening document feed area 21 and thereabove a photographing area 22 are framed by respective side panels 23 suitably supported by the cabinet frame.

Respective side closure panels 24 (FIG. 4) are supported by and suitably attached to the cabinet frame within the frame outlines afforded by the uprights 10, the lower horizontal frame bars 11 and the upper horizontal frame bars 14. In similar fashion, rear closure panel structure, desirably in the form of an upper vertical panel section 25 and a lower panel section 27 (FIGS. 3 and 3a) are attached within the rear frame outline of the cabinet. A top closure panel 28 completes the housing. At least the upper rear housing panel 25 is readily removably mounted for access into the back of the feed area 21 and the camera area 22.

Further description of the machine will proceed in relation to its operative cycle, that is, correlated with the flow or travel of continuous strip documents through the machine. It will be understood that suitable electrical circuitry is employed to afford driving power, control and coordination of functionally running or moving apparatus. Since this type of circuitry is well known, no space is devoted thereto in the drawings or description since details can easily be supplied by those skilled in this art.

Magazine

Within the magazine area 19 (FIGS. 1, 3 and 3a) a fanfolded document D of indefinite, substantial, continuous length is supported in a vertical stack in a tray structure including a supporting panel 29 having side flanges 30 secured to the liner panels 18. A rear upright retaining stop flange 31 on the tray member 29 affords a substantial vertical gap with the back closure structure of the housing. On its front edge the tray member 29 has a downwardly extending and underturned reinforcing and finishing flange 32 carrying a centrally disposed generally L-shaped retaining lip flange bracket member 33 releasably attached as by means of a screw 34 and adjustable in front-to-rear direction for proper retaining coaction with the front edge of the document stack in opposition to the upstanding flange 31 opposing the rear edge of the stack. For centering the stacked document D in the tray relatively adjustable generally L-shaped side retainer bracket plate members 35 are supported on the tray member 29. Through this arrangement the stacked document D is supported in the magazine tray in properly centered position and against any substantial transverse shifting, to facilitate feeding of the document strip to the feed area 21 thereabove as shown in FIGS. 3 and 3a.

In a practical arrangement, the tray structure is adjustable to accept document forms throughout a substantial range of width, in this instance being adaptable by virtue of the ability of the side retaining brackets 35 to accommodate forms as narrow as about six inches and as wide as about sixteen inches.

Feed mechanism

Feeding of the continuous strip document D into the machine is effected from the top of the stack in the magazine area 19 into the front of the document feed area 21. There the leading end of the document is engaged between the first of a series of spaced pairs of opposed feed rolls (FIGS. 1 and 3) comprising an upper driven frictional feed roll 37 and a lower idler pressure feed roll 38. Thence, the document progresses to and is engaged feedingly between a second pair of feed rolls comprising a driven roll 39 and an idler pressure roll 40 which deliver the document to a third set of feed rolls comprising a driven upper roll 41 and a lower idler pressure roll 42. Lastly, the document is received from the third set of rolls by a fourth set of feed rolls comprising an upper frictional driven feed roll 43 and a companion lower idler pressure roll 44.

A supporting carriage for the feed roll assembly as well as for apparatus in the photographing section 22, enabling bench assembly and then installation in the cabinet, is afforded by means including a pair of spaced parallel coextensive side plate panels 45 and 47, respectively, arranged to be located in suitable spaced clearance relation to the side closure panels 24 of the cabinet. Adjacent to their lower edges, the carriage panels 45 and 47 in assembly of the carriage within the cabinet supportingly engage upon the upper edges of the liner panels 18 which are reinforced and provide horizontal seats for this purpose by the provision of integral outwardly extending respective flanges 48 thereon. Removable attachment of the carriage against displacement from the mounted position within the cabinet is effected through means such as angular attachment brackets 49 secured by means such as respective screws 50 to the carriage panels 45 and 47 and to the seating flanges 48 (FIGS. 2, 4 and 5). Opposite end portions of respective shafts 51 of the friction rollers 37, 39, 41 and 43 are suitably journaled in parallel relation in the carriage panels 45 and 47 and with respective end portions of the shafts extending outwardly beyond the lefthand carriage panel 45 sufficiently to accommodate thereon respective corotatively affixed pulleys 52 of identical diameter over which a set of drive belts 53 is trained for driving all of the shafts 51 at identical speed in unison (FIG. 4).

Power for driving the feed roll shafts 51 is derived from a suitable electric motor 54 supported by a suitable motor mount 55 attached as by means of screws 57 to a supporting beam member 58 extending between and secured to the carriage side plates 45 and 47 in a suitable position above but adjacent to the driven feed rolls. Trained over a driving pulley 59 on the drive shafts of the motor 54 is a transmission belt 60 which drives a transmission pulley wheel 62 mounted on a shaft 63 carried rotatably by a bracket 64 attached to the inner face of the carriage panel 47. An outer end portion of the shaft 63 extends through a clearance opening 65 in the side panel 47 and has thereon a pulley 67 over which is trained a drive belt 68 engaging over a drive pulley 69 on the adjacent end portion of one of the feed roll shafts 51, herein the shaft for the second roll 39 in the series. Thus, by driving the one feed roll shaft 51, all of the other feed roll shafts are driven by the couplings provided by the drive belts 53.

In order to assure smooth, wrinkle-free, tensioned feeding of the document by the feed rolls, the diameters of the feed rolls 39, 41 and 43 are progressively larger by uniform increments than the diameter of the feed roll 37. Through this arrangement, the peripheral speed of the successive friction feed rolls is progressively greater by virtue of the uniform speed at which the roll shafts 51 are driven. In a desirable practical arrangement where the diameter of the feed roll 37 has been about 1.015 inch the diameter of the feed roll 39 has been about 1.030 inch and the diameters of the feed rolls 41 and 43 correspondingly progressively larger. This slight overrunning straightening, tensioning action is implemented by having the feed rolls divided into respective short separated sections as shown (FIGS. 4 and 7). One end section of the feed roll 39 is sufficiently shorter as seen in FIGURE 4 to facilitate assembly of its shaft 51 with the carriage plates 45 and 47 in view of the greater length of this shaft than the other roll shafts to accommodate the drive pulley 69.

For guiding the document and more particularly the leading end of the document into the feed rolls, a horizontal guide plate 70 is associated with the document engaging nip portions of the driven feed rolls 37, 39 and 41 being attached at its respective opposite sides to the carriage plates 45 and 47 by means such as respective brackets 71. A front portion of the guide plate 70 is constructed as a downwardly and inwardly oblique lead-in deflector 72 having an angular terminal marginal flange 73 secured to a front cross bar 77 attached at its opposite ends to the carriage plate panels 45 and 47. Respective individual clearance openings 78 are provided in the guide plate 70 for the respective sections of the feed rolls 37, 39 and 41, with upturned deflector flanges defining the back edges of the clearance openings adjacent to the off-running sides of the feed rolls 37 and 39.

In order to facilitate feeding of the leading end portion of the document strip into the feed roll assembly, as well as to enable making of quick adjustments should any be necessary, mounting of the idler pressure rolls 38, 40, 42 and 44 is desirably effected on a break-away plate 80 having a straight main panel or body portion to serve as a guide in suitably spaced opposing underlying relation to the guide plate 70 to provide a path for the document therebetween (FIGS. 3 and 6). Side flanges 81 and the break-away plate depend in spaced parallel relation and are disposed in adjacent spaced relation to the respective carriage panels 45 and 47 which pivotally support the break-away plate through suitable trunnion means 82 extending into respective bearing apertures 83 in the flanges 81 adjacent to the rear portion of the break-away plate so that it can be swung down at the front.

Support for the front portion of the break-away plate 80 is afforded through manually operable respective latch arm plates 84 mounted on the outer sides of the respective side flanges 81 on pivotal studs 85 which are biased by respective torsion springs 87 to swing normally in a forward direction for latching interengagement with respective fixed latch studs 88 carried by the adjacent frame panel and engaged in a dog leg latch slot 89 in the latch member 84. The arrangement is such that by pressing rearwardly on the depending latch members 84, the break-away plate can be released to drop down at its forward end about the pivot trunnions 82. To return the break-away plate 80 to operating position it is merely pressed upwardly until the latches 84 snap into latching engagement with the latch studs 88.

At its front margin the break-away plate 80 is constructed to cooperate with the lead-in guide plate portion 72 to provide an entry throat and a lead-in guide for the continuous strip document. For this purpose, the front margin of the break-away plate is formed as a downwardly curved and underturned flange 90 providing a smooth surface over which the continuous strip form document is trained into the feed rolls. For guiding the sides of the document as it runs over the lead-in front or nose flange 90, a pair of side guide flange members 91 is mounted on the lead-in flange 90. Each of the side guide flanges 90 is adjustable slidably from side-to-side and for this purpose is equipped with a stud 92 extending through a respective horizontal adjustment slot 93 and with a tensioned retainer 94 on the stud engaging the back of the flange 90. Thereby each of the side guide flange members 91 can be readily adjusted manually and will frictionally retain its adjusted position. Through this arrangement, the document strip is guided with substantial accuracy into the throat of the feed roll system, and it has been found that by virtue of the progressive overrunning of the successive feed rolls as well as the axially spaced sectional construction of the feed rolls any tendency to deviate from the straight flow path of the document is avoided and at least slight misalignments when the leading end is fed into the rolls are counteracted and the strip straightened as it travels down the feed path. This is accomplished at a high rate of feeding speed, at least seventy feet per minute having proved successful in practice.

Completing a rigid, inverted pan structure for the break-away plate 80, enabling the use of relatively thin sheet metal in its construction, is a rear generally curved and downwardly extending lead-off flange 95 facilitating travel of the document strip D downwardly beyond the last of the set of feed rolls. At its lower terminus the flange 95 is desirably provided with an underturned inwardly projecting reinforcing marginal flange portion 97 which cooperates with the generally opposite counterpart of the lead-in flange 90 for reinforcing the side flanges 81 which are integrally connected thereto. This construction provides an efficient cage mounting the document feed pressure idler rollers and other associated mechanism.

All of the idler pressure rolls 38, 40, 42 and 44 may be similarly constructed, such as of suitable metallic rod stock, of one piece construction, each having substantially the same diameter and each having its perimeter subdivided longitudinally to provide a set of axially spaced sections complementary to and coactive with the corresponding sections of the companion frictional surface driven feed roll. By having the document-engaging perimeters of the idler pressure rolls smoothly finished to minimize friction, resistance to the wrinkle-smoothing strip-straightening and aligning as well as tensioning action of the frictional plastic or rubber surfaced or otherwise frictionally equipped driven rolls is avoided. The fed document D is firmly, positively efficiently thrust against the respective driving sections of the driving rolls by resiliently yieldable radial thrusting mounting of the idler rolls within the breakaway cage to project the idler roll segments through respective clearance openings 98 provided therefor in the flat guide portion of the plate 80. At their rear margins the openings 98 are defined by upwardly and forwardly projecting deflector flange lips 99 which will avoid any possibility of catching thereon of the leading end of a strip fed through the feed path. Also, by having a spaced relationship between the lips 99 and the front edges defining the openings 98, which is less than the diameter of the roll sections, a stop or limit on outward projection of the idler rolls is provided when the roll cage is swung into open position.

For resilient pressure mounting of the idler rolls within the roll cage, they are sufficiently shorter than the distance between the side flanges 81 of the cage structure to enable respective end shaft portions of the idler rolls to be supported within the cage. Each of the front and rear idler rolls 38 and 44 is supported by a respective rocker arm 100 attached to the end shaft portions of the roll and pivotally attached as by means of respective trunnion members 101 to the adjacent side wall flange 81. Torsion springs 102 carried by the trunnion members 101 bias the arms 100 to swing the respective idler rolls 38 and 44 normally toward the plate 80 and thus under resilient pressure against the respective companion driven feed rolls 37 and 43. To similar effect, each of the intermediate idler rolls 40 and 42 is suitably mounted as by means of vertical guides 103 while a coiled torsion spring suitably mounted between these rolls has biasing arms 104 thrusting against the shaft end portions of the rolls and urging them under resilient bias toward the plate 80 and thus into thrusting pressure engagement with the companion driven feed rolls 39 and 41.

Also operatively carried by the roll cage are document sensing means, functionally related to electrical control circuitry of the machine, and providing information in respect to the document strip D advancing through the feed path afforded by the feed roll system. Accordingly, as best seen in FIGURES 3 and 6–7, a pair of substantially identical sensing finger plate strips 105 are provided each attached as by means of screws 107 along one margin to a pivot bar 108 suitably journalled at its opposite ends in respective mounting brackets 109 affixed to and projecting from the underside of the plate 80. Each of the sensing members 105 is provided with a plurality, herein three, sensing or feeler fingers 100 projecting from and comprising part of its free longitudinal margin. These feeler fingers are spaced apart complementary to the spacing between the idler roll sections to project through respective clearance openings 111 in the plate 80 defined at their rear margins by respective downturned finishing and deflector flanges 112.

One of the sensing members 105 is mounted in association with the feed rolls 41 and 42 while the other of the sensing members 105 is mounted in association with the feed rolls 43 and 44, and the clearance openings 111 are generally aligned in alternate spaced relation with the related openings 98 clearing the sections of the idler rolls 42 and 44. Mounting of the sensing members 105 is such that the feeler fingers 110 project diagonally upwardly and rearwardly through the respective openings 111 for engagement by the document D. Means for yieldably biasing the sensing members 105 to maintain the fingers 110 in the sensing position comprise respective coiled torsion springs 113 mounted on the associated rock shaft 108 and having respective anchor arms 114 bearing against the plate 80 and resilient biasing arms 115 engaging under the respective associated sensing member 105 and functioning normally to bring the same counterclockwise as viewed in FIGURE 6. When no document D is in the feed path, the feeler fingers 110 are backed against the front edges defining the openings 111 and with the document-engaging terminals of the fingers extending across the document path in position to be engaged by the advancing document which thereby swings the sensing member 105 clockwise.

As each of the sensing members 105 is rocked by engagement of its fingers 110 with the document, a microswitch associated therewith (FIGS. 7-9) and suitably mounted on a bracket 118 carried by the plate 80 is actuated through an actuating lever 119 pivotally mounted on the switch unit and engaged by an actuating arm 120 projecting fixedly from a connector 121 fixedly corotatively mounted on an end portion of the associated rock shaft 108. The lever 119 and the arm 120 are properly adjusted to actuate and close the associated microswitch 117 when the associated sensing member 105 is rocked by engagement with the document D and to permit the microswitch to open in the absence of such engagement by the document.

*Photographing*

As the leading end of the document D engages and rocks the first sensing member 105 and thus trips the associated microswitch 117 a control circuit to a magnetic camera clutch 122 (FIG. 4) associated with the motor driven shaft 63 is actuated to couple a pulley 123 drivingly with this shaft and thereby drive an associated belt 124 which is drivingly connected with a camera driving transmission 125 for operating a flow camera housed in one portion of a casing 127 which also serves to house electrical control apparatus and is suitably mounted through bracket structure 128 and 129 at its respectively opposite sides to and between the upper forward margins of the carriage panels 45 and 47. Suitable doors 130 on the front of the casing 127 permit access into the camera compartments, and a door 131 permits access into the electrical control panel and mechanism compartment within the casing. A manually operable knob 132 on a shaft 133 extending rearwardly through the casing enables film protection control through manual operation of the camera operating transmission structure 125. It will be understood that, in customary flow film camera operation, the linear speed of the film in the camera will be caused to synchronize with the linear speed of travel of the document D in the feed path to attain the proper reduction ratio of document size to filmed image, in this instance being desirably 26:1.

In the present arrangement, the camera has an objective lens structure 134 (FIGS. 3 and 4) located at one side of the front-to-rear vertical central plane through the machine and on an axis parallel to the front of the machine for reflection thereinto by a prism 135 mounted on the housing 127 of the document image transmitted thereto by a properly located tilted elongated reflecting mirror 137 mounted in the optical path on a supporting bar 138 having its ends suitably adjustably secured to the carriage panels 45 and 47 above the exposure zone defined between the feed rolls 41 and 43.

Between the angular reflecting mirror 137 and the exposure zone means are provided for optically scanning and intensely illuminating the exposed portion of the document. For this purpose a pair of elongated illuminating lamps 139 (FIGS. 3 and 5) are suitably mounted parallel to and above and adjacent to respectively the feed rolls 41 and 43 and in spaced adjacency on opposite sides of the optical path from the exposure zone to the mirror 137. Suitable mounting brackets 140 are provided for the respective opposite ends of the lamp tubes 139, supported by the carriage panels 45 and 47 within access cut-outs affording rearwardly opening recesses 141 in the carriage panels back of the supporting beam 58 which is of equal width and provides a front wall of a light housing chamber to screen the light from the lamps from the interior of the photographing area 22. A top wall is provided for the light chamber by a panel 142 which is secured at its side margins to the carriage panels 45 and 47 in substantially horizontal alignment with the upper edges defining the openings 141 and has its forward margin resting on and secured to the beam member 58. A lower wall for the light chamber is provided by a panel 143 resting at its opposite side margins upon the lower edges defining the openings 141 in the carriage panels and secured at its front margin to the lower margin of the beam member 58.

Intense illumination of the exposed incremental portion of the document D entirely thereacross between feed rolls 41 and 43 is through an exposure aperture 144 in the lower lamp housing wall 140, by preference of a length to extend entirely between the carriage panels 45 and 47 and of a maximum width between shielding and light confining opposed downwardly projecting angular flanges 145 along the front and rear edges defining the aperture and extending in spaced relation over and along the confronting portions of the feed rolls 41 and 43 respectively. It will be observed in FIGURE 3 that the forward one of the exposure light confining flanges 145 terminates adjacent to the rear edge of the guard plate 70 and that the exposed portion of the document D is efficiently exposed to the light from each of the lamps 139.

Scanning of the illuminated exposed area of the document D is effected through a scanning slit aperture 147 provided in the top wall 142 (FIGS. 2-4) and aligned with the exposure aperture 144 in the optical path to the angular reflecting mirror 137. An appropriately shorter length and narrower width of the scanning aperture 147 than the exposure aperture 144 at the proper height of the aperture above the face of the document in the optical path assures the desired image reduction. In addition, the scanning aperture 147 is of novel intermediately narrow and wider terminal shape to practically eliminate any fall-off in light intensity at the sides of the photographic image. To this end, instead of having the customary straight parallel longitudinal edges, the aperture 147 is provided with only one straight longitudinal edge. The opposite longitudinal edge, while straight throughout a substantial central portion, has its opposite end portions convexly curved as at 148 (FIG. 4) on a large radius and joining a short straight terminal edge portion 149. As a result, the scanning aperture 147 is larger in its opposite end portions and becomes gradually narrower toward a central elongated portion so that it provides a substantially narrower aperture slit throughout about half its length in the central longitudinal portion thereof gradually widening out to a maximum width at the opposite ends of the aperture slit. Stated another way, the scanning slit aperture 147 has a light intensity compensating masking portion 150 which uniformly narrows about the central half of the slit with progressive widening of the slit toward its opposite ends, thereby compensating effectively for the usual over-illumination of the central portion of the image as compared to the sides of the image and thus assuring a filmed image of practically equal intensity throughout its width.

Desirably a vertical light shield panel 151 is provided between the vertical portion of the optical path and the forward interior of the photographing area, herein provided by a vertical plate 151 mounted on the forward margin of the housing top wall and scanning aperture panel 142 forwardly from the scanning aperture 147 and substantially coextensive in width with the length of such aperture and with its upper edge adjacent to but adequately below the horizontal portion of the optical path leading to the prism 135 which bends the light into the camera objective 134.

Since both the motor 54 and the lamps 139 produce heat in operation, a ventilating fan 152 is provided which is suitably mounted on the rear portion of the lamp housing top wall 142 (FIGS. 3–5) and directed to exhaust through a protective grill or screen 153 opposite thereto in the upper rear wall panel 25 of the cabinet.

Concurrent photographic running of the camera continues until the trailing end of the document being photographed leaves the second of the document sensing switch actuators 105 which is disposed with its document engaging fingers 110 adjacent to the feed roll 43 and just beyond the document-leaving side of the exposure zone generally defined between the exposure aperture flanges 145. In other words, the camera clutch 122 remains energized to continue operation of the camera by motive power derived from the motor 54 as long as either of the microswitches 117 remains closed and disengages the camera drive to halt the camera when both of the microswitches are open. It will be understood, of course, that any of the usual or preferred safety controls may be employed in connection with the camera such as film tension safety switch, end of film shut-off switch, and the like. Also, various visual signalling or indicating devices, manual control switch means and the like may be provided in suitable positions such as in the areas 154 indicated in FIGURE 1 on the upper front cabinet panels 23.

*Restacking*

As the document strip D leaves the feed rolls 43 and 44, it is diverted downwardly past the rear flange 95 of the break-away plate 80 by a deflector 155 (FIG. 3) conveniently in the form of a curved plate mounted in spaced relation back of the flange 95. Cooperatively related to the upper end of the deflector 155 and to avoid any possibility of the leading end of the document strip escaping the deflector, is an angular hold-down bracket plate 157 attached through side flanges 158 to the carriage panels 45 and 47 and having respective openings 159 clearing the respective sections of the rear feed roll 43. At its front margin the hold-down member 157 has an upturned lead-in flange 160 serving as a downward deflector adjacent to and extending from the lower end of the rear exposure aperture flange 145.

Desirably, a static eliminator or discharge device is provided to discharge static electricity that may accumulate on the rapidly fed document strip D in passing through the feed mechanism. In one practical form, such a static eliminator comprises a strand or strip 161 (FIGS. 3 and 5) having numerous brush-like generally radial fine metal strand projections 162 against which the surface of the document brushes as it travels thereby. For this purpose the static eliminator strip 161 is mounted adjacent to the lower, document-leaving end of the document discharge throat between the guide plate flange 95 and the deflector plate 155, tensioning coil springs 163 connected to the ends of the strip maintaining it taut across the path of travel of the document and having hook terminals 164 engaging detachably with respective brackets 165 attached to the carriage panels 45 and 47.

Beyond the static eliminator 161, the document strip continues traveling downwardly inside the cabinet panel structure 27 and in the clearance provided for this purpose behind the rear retainer flange 31 of the magazine toward the receiving and stacking area 20 (FIGS. 1, 3 and 3a). In this area the sectionally hinged form strip is efficiently fan-folded and restacked.

As the document strip D moves downwardly it is guided between the magazine tray rear flange 31 and a smooth liner panel 167 at the inner side of the cabinet panel structure 27 toward the stack area wherein the hinged fan-fold sections of the continuous strip are refolded and restacked in proper sequence. This necessitates proper folding forwardly and rearwardly, in generally zigzag fashion of the hinge joints between the successive form sections of the continuous strip while uninterruptedly flowing at the speed of operation of the machine. Since the paper of which fan-folded strip forms of this nature are made is of sufficient weight, gravity restacking is practical, but means must be provided to assist the fan-folding of the strip from the in line generally straightened out orientation of the successive form panels or sections during vertical travel from the leaving or discharge rear end of the feed assembly downwardly past the magazine into the receiving and stacking section wherein the hinged form sections resume the fan-folded relationship. To this end, shunting means are provided as reasonably close as practicable to the lower end of the gap between the flange 31 and the panel 167, herein in the form of a downwardly and forwardly angled deflector flange 168 of limited extent sufficient to direct forwardly hinged form sections forwardly away from the back wall of the cabinet substantially as shown in dot dash outline in FIGURE 3a. Thereby the forwardly hinged end of the thus deflected document section is properly oriented to fold forwardly and assume proper position at the front of the restacked document strip.

As the rearwardly hinged end of the document section passes the deflector 168, the succeeding document section, which thus has its leading end connected through the rearward hinge, is acted upon to continue in downward travel along the rear wall of the cabinet whereby to assure proper stacking of the attached preceding document section. In a simple and efficient manner this is accomplished by rearwardly urging or attracting the rearwardly hinged section, as it descends past the short downwardly and rearwardly angled reinforcing and deflector flange portion 169 on the terminus of the deflector 168, toward a forwardly facing back wall panel 170 defining the rear of the receiving and stacking section 20. Gently, low pressure, steady suction of air through suction holes or orifices 171 in the wall panel 170 has been found quite efficient for this purpose. As best seen in FIGURE 1, the suction orifices are provided in a multiple pattern which will be most effective for the purpose, a desirable arrangement comprising a uniform pattern of horizontally and vertically as well as diagonally aligned rows of the orifices with the upper horizontal rows of larger diameter than the lower horizontal rows of apertures and thus of greater cross-sectional flow area for increased suction volume therethrough in the vicinity of the deflector 168 for more pronounced air pressure to drive the document strip toward the back wall 170 from its spaced relation thereto caused by the deflector. Where, as shown, there are six horizontal rows of the orifices 171, the lower three rows are desirably of smaller diameter and thus of smaller individual and aggregate cross-sectional flow area than the upper three rows of orifices. After the descending document section to be thus acted upon makes face-to-face contact with the back wall 170, substantially as indicated in full outline in FIGURE 3a, the suction afforded by the smaller diameter orifices 171 is sufficient to hold it throughout the remainder of downward travel.

It will be appreciated, that the suction exerted through the orifices 171, while it must be sufficient to control downward movement of the document sections which are rearwardly hinged along their leading ends, must be moderate enough to avoid such hold on the document as will interfere with full speed gravitational downward travel caused by the combined weight of the attracted section and the preceding downwardly folding section to the stack position of the rearwardly hinged connection of the sections as shown in FIGURE 3a. Further, the suction must be sufficiently moderate to permit easy breaking away of the engaged document section, after bottoming of the leading end hinge on the stack as shown in FIGURE 3a. Such breaking-away is effected by forward deflection of the succeeding document section connected through the trailing forwardly hinged connection providing a forward bias upon the trailing end of the suction-controlled section which is progressively peeled away from the suction panel until it swings freely into folded relation on the stack as shown in the dot dash illustration of FIGURE 3a.

Efficient means for effecting the described suction comprise a small volume electrical fan 172 mounted in generally centered relation behind the suction panel 170 on a rear wall of a housing member 173 enclosing a suction chamber 174 coextensive with the suction panel and from which the fan 172 blows exhaust through a suitable exhaust opening 175 in the wall upon which mounted. A protective screen 177 may close the exhaust opening.

In the bottom of the stacking area or compartment 20 means are provided for receiving the restacked document D in a manner to implement the forwardly dragging action of those document sections which are forwardly hinged at their leading ends to overcome the effects of any residual static electricity which might otherwise tend to cause resistance to proper stacking and thus buckling of the immediately preceding underlying hingedly attached document section. For this purpose a humped stacking plate 178 is provided which in this instance is mounted upon the base plate 12 of the cabinet provided with a ridge 179 extending from side-to-side across the stacking compartment and affording a forwardly and downwardly sloping or inclined forward portion 180 which affords a sufficient downward and forward tilt or incline to the stack to provide sufficient gravitational impetus to the forwardly hinged portion of the document at the velocity of movement into the stack to assure pulling of the underlying document section parallel to the surface of the stack. In practice, where the feed rate is about seventy feet per minute, a pitch of about 18° to 20° to the horizontal has been found satisfactory. Rearwardly from the intermediate ridge 179, the stack receiving plate 178 has a rearwardly and downwardly inclined receiving portion 181 affording full clearance forwardly from the suction area of the rear wall panel 170 and also assuring that the rear end hinged portions of the stacked sections of the document will be biased onto the stack in buckle-free condition.

At the front of the stack-receiving area, retaining means are provided conveniently in the form of an upstanding rearwardly facing flange member 182 having, in L-shape relation thereto, a rearwardly extending lower end or base flange 183 provided with side wing portions 184 slidably engaged in keyway type guide brackets 185 for convenient front-to-rear adjustment within a clearance recess or cut-out 187 in the base panel 12 and the front portion of the stack receiving panel 178.

From the foregoing it will be seen that there has been provided by the present invention an efficient high speed automatic machine in which fan-folded documents which have been loaded into the magazine in a fan-folded stack are fed at high speed from the magazine through an exposure zone of a synchronized flow camera optical path and equipped for microfilming the documents with unusual uniformity of image, whereafter the document strip is continuously restacked into the original fan-folded condition, all as a continuous process.

It will be understood that modifications and variations may be effected without departing from the scope of the novel concepts of the present invention.

I claim as my invention:

1. In a photographing machine including an exposure zone for documents to be photographed,
    a feeding assembly for transporting a document to be photographed through said zone including:
        a series of successive frictional feed rolls,
        means for driving said feed rolls in unison,
        said feed rolls travelling at successively greater peripheral speed,
        and respective idler rolls pressing a document in direct frictional feeding relation against said feed rolls,
    whereby a document engaged by the feed rolls is placed under wrinkle-free tension.

2. A machine as defined in claim 1 wherein each of the feed rolls comprises an axially spaced series of spaced feeding sections and the idler rolls comprise complementary sections, whereby to enable document straightening as well as tensioning as fed through the feeding assembly.

3. In a document photographing machine of the flow camera type including a document exposure zone,
    means for feeding a document through the exposure zone including a series of feed rolls and companion idler rollers arranged for direct gripping of the document therebetween and defining a feed path through the exposure zone,
    means driving the feed rolls at a common axle speed,
    said feed rolls having frictional perimeters of respectively progressively greater diameter in the direction of feed,
whereby the peripheral velocity of the successive feed rolls is progressively greater in proportion to the increase in diameter in the series for placing the document in the feed path under wrinkle-free tension in passing through the exposure zone.

4. In a document photographing machine including a cabinet having a front opening document magazine area and a document feeding assembly,
    said feeding assembly including means defining an entry throat at the front of the machine leading rearwardly into the feeding assembly for receiving a document from the magazine area to be fed into the feeding assembly,
    means for driving the feeding assembly to drive a document rearwardly in the cabinet,
    and means at the rear of the feeding assembly for guiding a document therefrom downwardly within the cabinet,
    said feeding assembly including a plate member having front and rear downturned flanges providing parts of respectively the front throat and rear guide means.

5. In a document photographing machine including a cabinet having a front opening document magazine area and a document feeding assembly,
    said feeding assembly including means defining an entry throat at the front of the machine leading rearwardly into the feeding assembly for receiving a document from the magazine area to be fed into the feeding assembly,
    means for driving the feeding assembly to drive a document rearwardly in the cabinet,
    and means at the rear of the feeding assembly for guiding a document therefrom downwardly within the cabinet,
    said feeding assembly including a plate member having front and rear downturned flanges providing parts of respectively the front throat and rear guide means,
    said plate being pivotally mounted and having latch means releasable for swinging the plate pivotally away from the remainder of the feed assembly.

6. In a document photographing machine including a document exposure zone,
    a document feed assembly associated with said exposure zone including a series of successive driven feed rolls,
    and a roll cage comprising a generally pan-shaped plate structure supporting a series of idler pressure rolls complementary to and pressing toward the respective feed rolls to maintain a document in engagement therewith in feeding through the feed assembly,
    said roll cage being releasably mounted with respect to the feed rolls for shifting away therefrom to move the idler rolls as a unit into spaced relation to the feed rolls.

7. In a document photographing machine including a document exposure zone,
    a document feed assembly associated with said exposure zone including a series of successive driven feed rolls, and a roll cage comprising a generally pan-shaped plate structure supporting a series of idler pressure rolls complementary to and pressing toward the respective feed rolls to maintain a document in engagement therewith in feeding through the feed assembly, said roll cage being releasably mounted with respect to the feed rolls for shifting away therefrom to move the idler rolls as a unit into spaced relation to the feed rolls, said roll cage plate structure including a lead-in flange over which a document is adapted to travel into the nips of the feed and idler rolls, said flange having mounted thereon adjustable document aligning members.

8. In combination in a document photographing machine including an exposure zone and photographing means aligned with the exposure zone, means for feeding documents to be photographed through the exposure zone including a guide plate over which the documents travel through the exposure zone.

document engaging roll means carried by the plate, openings in the plate through which the rolls project into engagement with a document fed over the plate, a document sensing member including an elongated rock shaft and having a plurality of document engaging fingers projecting beyond one side of the rock shaft, means pivotally mounting the rock shaft to the plate on the same side of the plate as the rolls, apertures through the plate through which the fingers project, means biasing the rock shaft to effect normal projection of the fingers into the path of a document advancing over the plate, an arm projecting from the rock shaft and swingable in document actuated rocking movements of the rock shaft, and switch means carried by the plate controlled by swinging movements of said arm for controlling the photographing means to operate when a document is fed through the exposure zone by the feed means.

9. In a machine for photographing documents and including an exposure zone through which a document is adapted to be fed for photographing, a feed assembly associated with said exposure zone and including a plurality of driven frictional feed rolls, and a break-away roll cage mounted for movement toward and away from said feed rolls and having mounted thereon a plurality of idler pressure rolls for thrusting a document against the feed rolls in a feed path through the exposure zone, means movably supporting the idler rolls on said cage and biasing the rolls toward the opposing feed rolls, and stop means on said cage engageable by the perimeters of the idler rolls in opposition to their bias when the cage is moved away from the feed rolls.

10. In a document photographing machine including a cabinet having a front opening document feeding assembly arranged to transport documents rearwardly and a document exposure zone traversed by the feeding assembly, the improvement comprising:

said feeding assembly comprising a series of driven feed rolls mounted in said cabinet and located successively from the front opening rearwardly, a break-away roll cage under said feed rolls and carrying idler pressure rolls corresponding to and thrustable toward the feed rolls to press a document against said feed rolls for feeding through said exposure zone, means pivotally mounting said cage adjacent to the rear end of the feeding assembly for swinging movement about the pivot downwardly to carry said idler pressure rolls away from said feed rolls and being swingable upwardly to return the idler rolls to pressing cooperation with the feed rolls, and releasable latch means on the front end portion of the cage and on the cabinet for retaining the cage in the up-swung relation to the feed rolls.

11. A machine as defined in claim 10 in which said roll cage comprises an inverted generally pan-shaped plate structure including a front downturned guide portion and side downwardly extending flanges, said latch means comprising respective latch arms pivotally mounted on said downturned flanges, means on the cabinet releasably interengageable with said latch arms, and means for biasing the latch arms normally into interengaged relation with said means on the cabinet, release of the latch arms being effected by pressing rearwardly thereon against the biasing means to swing the cage downwardly, and return of the cage to upward latched position being effected by pressing upwardly on the front portion of the cage until the latch arms snap into engagement with said means on the cabinet under the influence of said biasing means.

References Cited
UNITED STATES PATENTS

| | | | |
|---|---|---|---|
| 2,632,643 | 3/1953 | Egan et al. | 88—24 |
| 2,651,242 | 9/1953 | Neely | 226—90 X |
| 2,719,714 | 10/1955 | Pratt et al. | 88—24 X |
| 2,896,505 | 7/1959 | Nations | 226—90 X |
| 3,010,361 | 11/1961 | Pfaff | 88—24 |
| 3,072,310 | 1/1963 | Kunz | 226—189 X |

NORTON ANSHER, *Primary Examiner.*

R. A. WINTERCORN, *Assistant Examiner.*